United States Patent [19]

Jacono et al.

[11] Patent Number: 4,987,166

[45] Date of Patent: Jan. 22, 1991

[54] BITUMINOUS COMPOSITION FOR ROAD SURFACING

[75] Inventors: Carmelo Jacono; Salvatore Tribastone, both of Ragusa, Italy

[73] Assignee: Enichem Anic S.p.A., Palermo, Italy

[21] Appl. No.: 569,406

[22] Filed: Aug. 17, 1990

Related U.S. Application Data

[63] Continuation of Ser. No. 315,420, Feb. 24, 1989.

[30] Foreign Application Priority Data

Mar. 11, 1988 [IT] Italy ............................. 19732 A/86

[51] Int. Cl.$^5$ ............................................. C08L 95/00
[52] U.S. Cl. ........................................ 524/68; 524/70; 524/71
[58] Field of Search ........................................... 524/68

[56] References Cited

FOREIGN PATENT DOCUMENTS 150068 8/1981 Fed. Rep. of Germany .

*Primary Examiner*—John C. Bleutge
*Assistant Examiner*—David W. Woodward
*Attorney, Agent, or Firm*—Hedman, Gibson, Costigan & Hoare

[57] ABSTRACT

A homogeneous composition for road surfacing contains a bitumen for road use and a quantity of a mixture of thermoplastic organic polymers of up to 20 parts by weight per 100 parts by weight of the bitumen, said mixture containing not less than 40% and up to 70% by weight of one or more polyolefins, the remaining percentage consisting essentially of polyvinylchloride, polyethylene terephthalate and polystyrene.

This mixture of thermoplastic polymers can be obtained by recovering and recycling the plastics material contained in solid urban refuse or in industrial waste.

7 Claims, No Drawings

BITUMINOUS COMPOSITION FOR ROAD SURFACING

This invention relates to bituminous key for road surfacing and in particular to bituminous compositions containing minor quantities of a mixture of thermoplastic organic polymers which is able to improve the characteristics and performance of the bitumen. It is known in the art to add minor quantities of thermoplastic organic polymers to bitumens for road use, the polymers used for this purpose being polyethylene or mixtures of polyethylene and polypropylene, generally deriving from refuse or waste. This improves the mechanical characteristics of the bitumens and in particular their stability under load and under high temperature. According to the present invention it has now been found possible to obtain homogeneous compositions comprising bitumens for road use and organic polymer mixtures which in addition to polyolefins contain significant quantities of polyvinychloride, polyethylene terephthalate and polystyrene.

It has also been found that said homogeneous mixtures produce unexpectedly improved results when used for road surfacing. It therefore becomes possible to obtain improved bituminous compositions from thermoplastic organic polymer mixtures recovered from solid refuse and certain industrial wastes, so assisting in solving an ecological problem.

In accordance with this the present invention provides a homogeneous composition for road surfacing containing a bitumen for road use and a quantity of a mixture of thermoplastic organic polymers of up to 20 parts by weight per 100 parts by weight of the bitumen, said mixture containing not less than 40% and up to 70% by weight of one or more polyolefins, the remaining percentage consisting essentially of polyvinychloride, polyethylene terephthalate and polystyrene.

Conveniently, the polyolefin fraction of the polymer mixture consists of polyethylene (of low and/or high density), or of polyethylene containing minor quantities of polypropylene. Typically said mixture of thermoplastic organic polymers has a composition within the following ranges:

| | |
|---|---|
| polyethylene | 35–60% by weight |
| polypropylene | 5–10% by weight |
| polyvinylchloride | 10–25% by weight |
| polyethyleneterephthalate | 5–15% by weight |
| polystyrene | 5–10% by weight |

As stated heretofore the polymer mixture can be obtained by recovering and recycling the plastics materials contained in solid urban refuse and in certain industrial wastes.

Solid urban refuse is known to normally comprise glass, paper and various organic compounds, and plastics materials deriving mainly from wrappings, packaging products or the like, all in mixture with metal.

This refuse can be subjected to operations such as mechanical grading by screening, magnetic separation, blowing, washing, centrifuging, flotation or separation based on density. The plastics material separated by one or more of said operations and then reduced to fragments represents a mixture of thermoplastic organic polymers suitable for the purposes of the present invention.

The bitumens suitable for the composition of the present invention are generally bitumens for road use (in accordance with ASTM D 946-T), those preferred for this purpose being the bitumens known in the art as (vacuum) distilled and reconstituted bitumens which generally have penetration valves of between 40 and 200 dmn (in accordance with ASTM D-5) and ring and ball values of between 35° and 60° C. (in accordance with ASTM D-36).

The quantity of thermoplastic organic polymer mixture in the composition can generally vary from 0.5 to 20 parts by weight and preferably from 5 to 8 parts by weight per 100 parts by weight of bitumen.

The bituminous compositions of the present invention are homogeneous compositions with a bitumen matrix, having the following general characteristics:

| | |
|---|---|
| penetration test: | from 20 to 100 dmm (ASTM D-5) |
| ring and ball test: | from 50 to 100° C. (ASTM D-36). |

These bituminous compositions can be obtained by mixing and homogenizing the mixture of thermoplastic organic polymers operating at a temperature of between 170° and 210° C. and preferably between 180° and 190° C., if necessary following this by hot filtration to remove any suspended solids.

The bituminous compositions of the present invention can be used in bituminous mixes for road surfaces with improved characteristics in relation to stability.

The thermoplastic polymer mixtures can also be used as additives in bituminous mixes together with bitumen, grit, sand and filler for surfaces with improved characteristics in relation to stability.

The following example is submitted to illustrate but not to limit this invention.

EXAMPLE

A composition comprising vacuum bitumen (penetration test 130 dmm by ASTM D-5, ring and ball test 44° C. by ASTM D-36) and a mixture of thermoplastic organic polymers originating from solid urban refuse and having the following average composition:

| | |
|---|---|
| low and high density polyethylene | 40% by weight |
| polypropylene | 5% by weight |
| polyvinylchloride | 25% by weight |
| polyethyleneterephthalate | 15% by weight |
| polystyrene | 8% by weight |
| other polymers | 7% by weight | is prepared in a melter.

The bitumen and polymer mixture in a weight ratio of 100:6 are mixed together at 175° C. for 2 hours to obtain a bituminous composition having a penetration value of 64 dmm (ASTM D-5) and a ring and ball value of 58° C. (ASTM D-45).

With this composition a mix is prepared which is then used to surface about 700 m of a highway to a wear carpet depth of 3 cm, at ambient temperature of 24° C.

In total, 4500 m² of surfacing are laid using the equipment normally used for the purpose.

For comparison purposes an area of 1600 m² is also surfaced with a mix containing bitumen as such, i.e., without the addition of the polymer mixture.

Marshall stability tests are carried out on samples of the mix according to the invention and on the comparison mix, using the method prescribed by the National Research Council, Official Bulletin A VII, No. 30.

The Marshall resistance value obtained was 1761 kg in the first case and 1553 kg in the second case.

We claim:

1. a homogenous bituminous road paving composition, consisting essentially of road paving bitumen and a quantity of a mixture of thermoplastic organic polymers of from 0.5 to 20 parts by weight per 100 parts by weight of the bitumen, said mixture containing a blend of organic thermoplastic polymers consisting of from 35% to 60% by weight of polyethylene, from 5% to 10% by weight of polypropylene, from 10% to 25% by weight of polyvinylchloride, from 5% to 15% by weight of polyethyleneterphthalate and from 5% to 10% by weight of polystyrene; said blend is mixed at a temperature between 170° C. and 210° C.

2. A composition as claimed in claim 1, wherein said mixture of thermoplastic organic polymers is the product of the recovery and recycling of the plastics materials contained in solid urban refuse or in industrial waste.

3. A composition as claimed in claim 1, wherein said bitumen is a distilled or reconstituted bitumen with a penetration test valve of between 40 and 200 dmm (by ASTM D-5) and a ring and ball test value of between 35° C. and 60° C. (by ASTM D-36).

4. A composition as claimed in claim 1, comprising from 5 to 8 parts by weight of said mixture of thermoplastic organic polymers per 100 by weight of bitumen.

5. A bituminous mix comprising the bituminous compositions claimed in claims 1, 4, 5 or 7 which further comprises at least one filler.

6. A homogenous bituminous road paving composition of claim 1, wherein said blend is mixed at a temperature between 180° C. and 190° C.

7. A composition as claimed in claim 1, wherein the polyethylene fraction of the mixture of the thermoplastic organic polymers is selected from the group consisting of: low density polyethylene, high density polyethylene, and a mixture of high and low density polyethylene.

* * * * *